United States Patent
Donescu et al.

(10) Patent No.: US 6,427,028 B1
(45) Date of Patent: *Jul. 30, 2002

(54) METHOD FOR THE TRANSFORMATION OF IMAGES SIGNALS ON ARBITRARILY-SHAPED SEGMENTS

(75) Inventors: Ioana Donescu; Olivier Avaro, both of Paris; Christian Roux, St. Renan, all of (FR)

(73) Assignee: France Telecome, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,825

(22) Filed: Aug. 8, 1997

(30) Foreign Application Priority Data

Aug. 14, 1996 (FR) .............................. 96 10227

(51) Int. Cl.[7] .................................. G06K 9/36
(52) U.S. Cl. ....................... 382/243; 382/305
(58) Field of Search ................. 382/236, 238, 382/241, 242, 243, 250, 239, 305; 348/413, 416, 426, 402

(56) References Cited

U.S. PATENT DOCUMENTS

| | | | |
|---|---|---|---|
| 5,295,201 A | | 3/1994 | Yokohama .................. 382/48 |
| 5,608,458 A | * | 3/1997 | Chen et al. ................. 348/413 |
| 5,815,601 A | * | 9/1998 | Katata et al. ............... 382/232 |
| 5,825,929 A | * | 10/1998 | Chen et al. ................. 382/236 |
| 5,838,834 A | * | 11/1998 | Saito .......................... 382/243 |
| 5,886,743 A | * | 3/1999 | Oh et al. .................... 348/407 |
| 5,892,849 A | * | 4/1999 | Chun et al. ................. 382/236 |
| 5,905,815 A | * | 5/1999 | Mack et al. ................ 382/250 |
| 6,014,466 A | * | 1/2000 | Xia et al. ................... 382/243 |
| 6,078,695 A | * | 6/2000 | Kadono ...................... 382/243 |

FOREIGN PATENT DOCUMENTS

EP 649258 4/1995

OTHER PUBLICATIONS

Sikora et al. "Shape-adaptive DCT for generic coding for video" IEEE Transaction on Circuits and Systems for Video Technology vol. 5 pp. 59–62, Feb. 1995.*

Coefficient Grouping Method for Shape-Adaptive DCT, Electronic Letters, Feb. 1996, vol. 32, No. 3, pp. 201–202.

Low Complexity Shape-Adaptive DCT For Coding of Arbitrarily Shaped Image Segments, Signal Processing:Image Communication, Nov. 1995, Thomas Sikora, vol. 7, No. 4–6, pp. 381–895.

* cited by examiner

*Primary Examiner*—Amelia M. Au
*Assistant Examiner*—Jingge Wu
(74) *Attorney, Agent, or Firm*—Nilles & Nilles SC

(57) ABSTRACT

A linear transformation of the image signal on a segment with an arbitrary geometrical shape includes the following steps: the sub-division of the segment into sub-segments of regular shapes (rectangular, square or linear shapes), the application of an orthogonal linear transformation to each sub-segment, the combining of the coefficients coming from the first transformation into classes of coefficients according to a predetermined criterion, and the iteration of the transformation on the classes of coefficients, and which can be applied to the processing of images for encoding.

20 Claims, 7 Drawing Sheets

Sub-division | 2D→1D reading after transformation | Combining of CC and iteration of transformation | Final order of reading of the coefficients for encoding

FIG_2

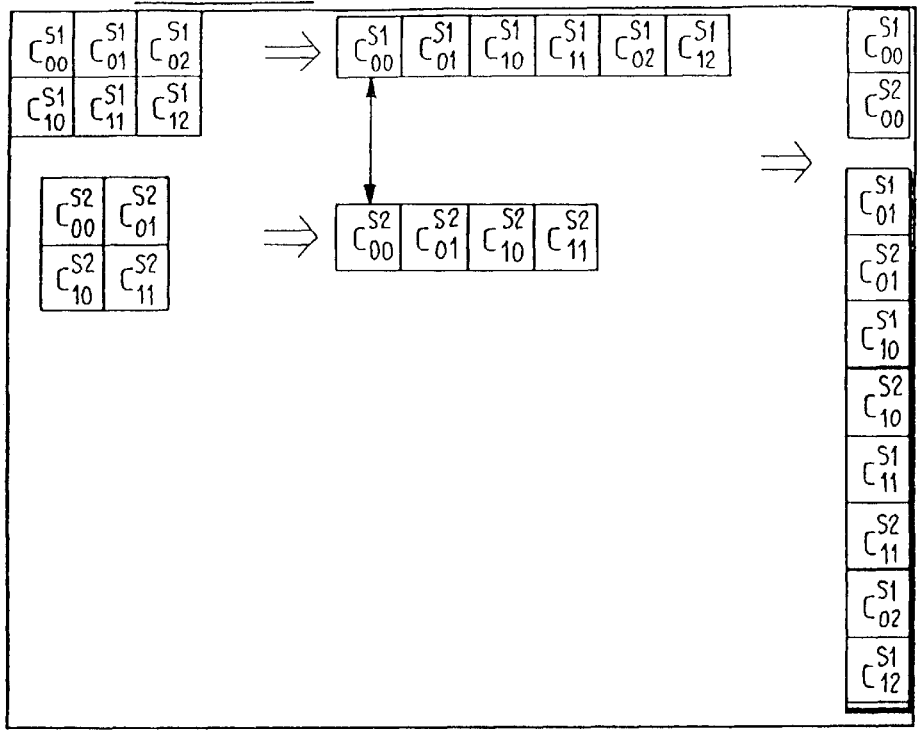
FIG_6A
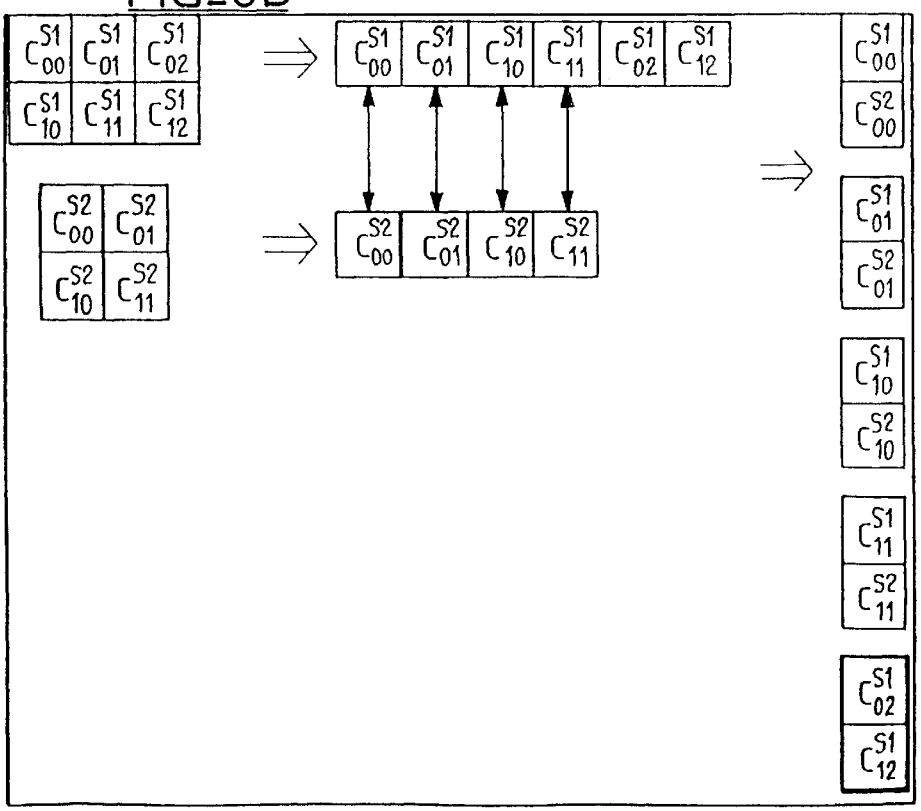
FIG_6B

FIG_6C
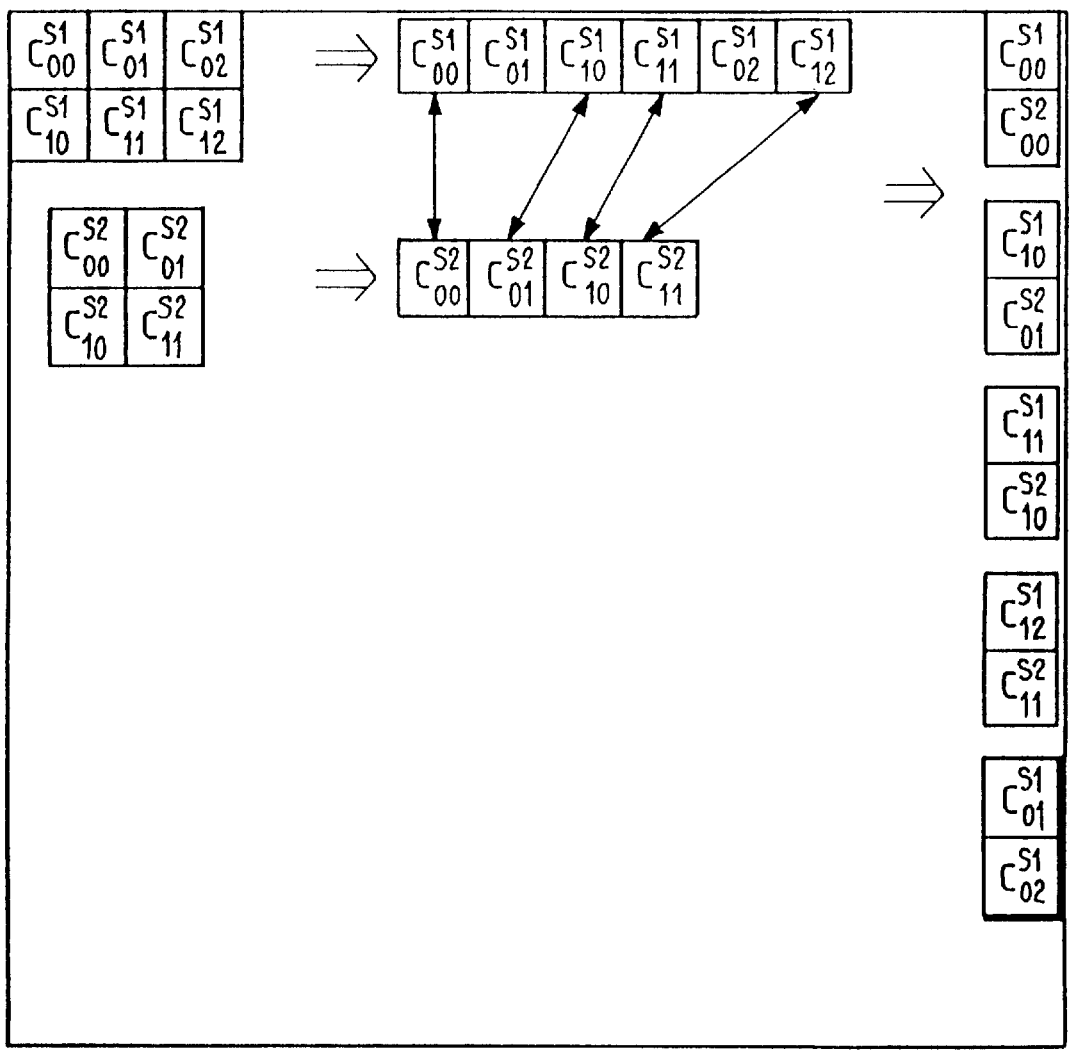

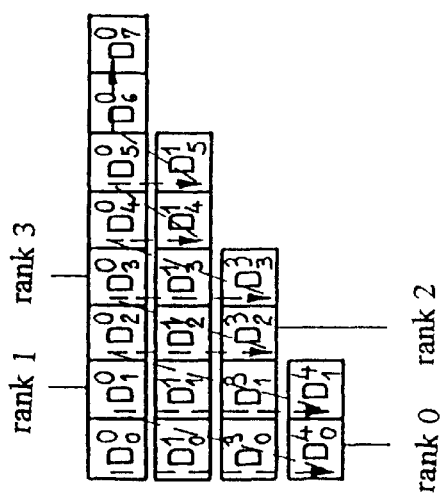
FIG_7
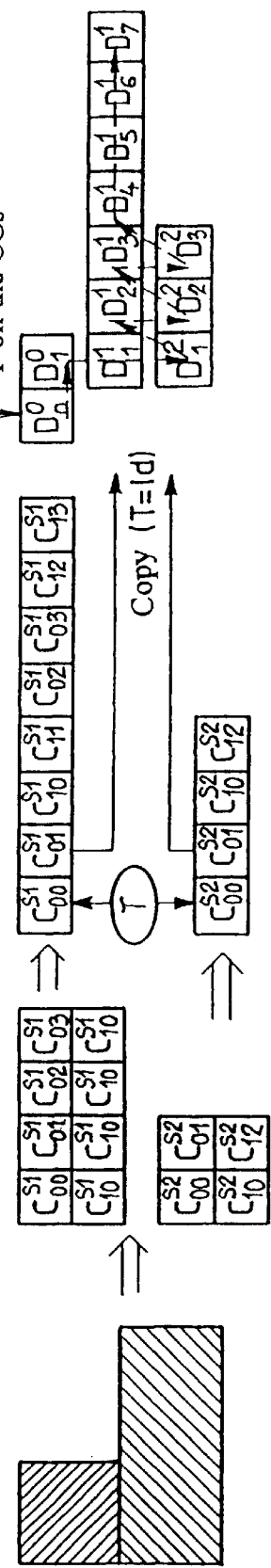
FIG_8

BACKGROUND
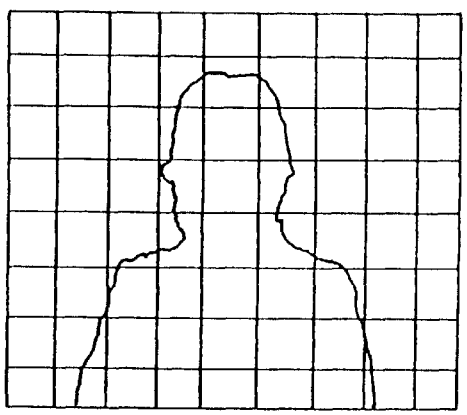
PERSON
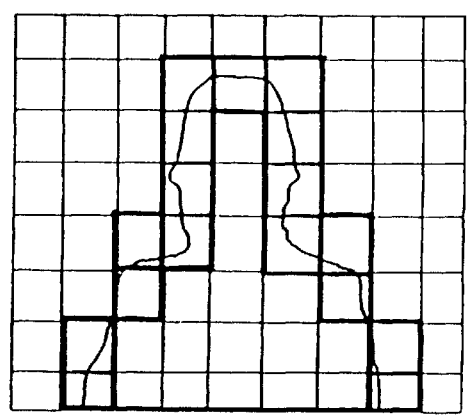
☐ BLOCKS ENCODED
BY PROPOSED METHOD
FIG_9A  FIG_9B

METHOD FOR THE TRANSFORMATION OF IMAGES SIGNALS ON ARBITRARILY- SHAPED SEGMENTS

BACKGROUND OF THE INVENTION

1. Field of the Invention

The present invention relates to a method for the linear transformation of image signals on arbitrarily-shaped segments.

The term image signal is understood herein to mean a 2D or 3D digital signal. The term segment is understood to mean the geometry of the region of the image defining the object of interest. The invention relates more particularly to a method for the linear transformation of an image signal on arbitrarily-shaped and arbitrarily sized segments with a view to encoding.

The invention can be applied to image encoding by linear transformation.

The method presented falls within the context of the development of a new class of image encoders known as object-oriented encoders. This is a novel approach to encoding in which the audiovisual scene is represented as a set of objects in motion. This opens the way towards the implementation of new functions related to digital images.

Standardized systems for the encoding of images with digital bit rate reduction (for example according to the H261 recommendation of the CCITT for video encoding at P times 64 Kbits/s) are based on a sub-division of the digital image into a set of square blocks (with a general size of 8×8) which undergo the encoding operations. This formulation is a rigid one and does not take account of the contents of each block, for example the existence of contours or sharp variations in luminance within a block.

The encoding of the image signal generally comprises a first phase of orthogonal linear transformation aimed at concentrating the energy of the signal and decorrelating its components The linear transformation used is generally the discrete cosine transform or DCT which can be implemented by simple or efficient algorithms and therefore enables real-time applications. The DCT has been chosen because it can be used to obtain a decorrelation close to the maximum when the signal can be represented by a separable first-order Markov process that is highly correlated, i.e. with a correlation coefficient close to 1.

It is however highly advantageous for many applications to show the image in terms of objects to be found, described and transmitted.

In this context, an object can be defined as a arbitrarily-shaped and arbitrarily-sized region of the image, which may represent either a physical object or a predefined zone of interest or simply a region that has properties of homogeneity with respect to one or more criteria.

An object may be described by its shape and texture.

Several authors have recently taken an interest in the search for appropriate methods to encode, firstly, the shapes of objects and, secondly, the texture of objects.

Reference may be made to the drawing of FIG. 1 which illustrates the different steps implemented by these methods. The processing of shapes comprises an encoding operation, transmission, decoding at reception and depiction.

The processing of the texture comprises an orthogonal transformation, a quantification and an entropic encoding, transmission, entropic decoding with reverse quantification and reverse transformation to reconstitute the texture.

The methods of linear transformation on square blocks of a size fixed in advance cannot be directly applied to objects with arbitrarily-shaped segments for the encoding of the texture.

Thus, the present invention relates to a new method of linear transformation for the encoding of the texture on objects that have arbitrarily-shaped segments.

2. Description of the Prior Art

Recent studies on the subject have been published by several authors. The methods proposed can be divided into two classes: adaptive methods and methods of extrapolation.

Adaptive methods consist of the adaptation of the orthogonal linear transformations to the geometry of the segment.

Reference may be made to the adaptation of the Karhunen-Loeve transformation to segments by S. F. Chang and D. G. Messerschmidt, Transform Coding of Arbitrarily-Shaped Image Segments, Proceedings of ACM Multimedia, Anaheim, Calif., USA, pp. 83–90, Aug. 1993 and the method for the generation of orthogonal bases on segments proposed by Gilge, T. Engelhardt and R. Mehlan, Coding of Arbitrarily-Shaped Image Segments Based on a Generalized Orthogonal Transform. Signal processing,: Image Communication 1, pp. 153–180, 1989.

This method recommends the orthonormalization of any family of vectors, which are free on the segment, by an algebraic method known as the Gram-Schmidt method. This method is however very cumbersome from the computational point of view and is therefore unsuited to"real-time" applications. Gilge's work has given rise to many studies on the fast generation of orthogonal bases on the segment ([M. Cermelli, F. Lavagetto and M. Pampolini, A Fast Algorithm for Region-Oriented Texture Coding, ICASSP, 1994, pp. 285–288], [W. Philips, A Fast Algorithm for the Generation of Orthogonal Base Functions on an Arbitrarily-Shaped Region, Proceedings of ICASSP 1992, Vol. 3, pp. 421–424, Mar. 1992, San Francisco], [W. Philips and C. Christopoulos, Fast Segmented Image Coding Using Weakly Separable Bases, Proceedings of ICASSP 1994, Vol. 5, pp. 345–348]).

The methods of extrapolation consisting in extending the signal to a regular segment which is generally the rectangle circumscribed in the segment to be encoded.

These methods enable the application of existing linear transformations to regular (rectangular or square-shaped) segments which are therefore fast and easy to implement. In this category of methods, the best known is the iterative method based on projections on convex sets proposed in H. H. Chen, M. R. Cinvalar and B. G. Haskell, A Block Transform Coder For Arbitrarily-Shaped Image Segments, International Conference on Image Processing (ICIP), 1994, pp. 85–89.

Other simpler methods have been tested, such as "zero-padding" (filling of the zone with zeros), "mirroring" (reflection of the signal on edges of the object) and morphological expansion ([S. F. Chang and D. G. Messerschmidt, Transform Coding Of Arbitrarily-Shaped Image Segments, Proceedings of ACM Multimedia, Anaheim, Calif., USA, pp. 83–90, Aug. 1993], [H. H. Chen, M. R. Chinvalar and B. G. Haskell, A Block Transform Coder For Arbitrarily-Shaped Image Segments, International Conference on Image Processing (ICIP), 1994, pp. 85–89]).

The two classes of methods recalled here above have their own advantages and drawbacks.

The adaptive methods have the advantage of perfect reconstruction with as many coefficients as there are points of the segment when no quantification is done. They enable the theory of encoding by linear transformation to be extended to arbitrarily-shaped segments. By contrast, they are generally cumbersome in terms of complexity and computation time.

The methods of extrapolation on the contrary offer an easy implementation suited to existing systems, but entail the risk of contributing artifacts related to the introduction of new frequencies in the signal.

For practical applications, it would therefore be worthwhile to combine the advantages of both categories of methods referred to here above, i.e. to use linear transformations that are fast and adapted to segments. The work done in D1 (M. Bi, W. K. Cham and Z. H. Zheng, Discrete Cosine Transform on Irregular Shape for Image Coding, IEEE Tencon 93 Proceedings, Beijing, pp. 402–405) and D2 (T. Sikora and B. Makai, Shape Adaptive DCT for Generic Coding of Video, IEEE Transactions on Circuits and Systems for Video Technology, Vol. 5, No. 1, pp. 59–72, Feb. 1995) proposes the application of a standard DCT orthogonal transformation separately on the rows and columns of the segment, by analogy with the row/column separability of the standard orthogonal transformations. This separability enables the successive application of two one-way transformations.

In D1, the authors propose a stage of analysis of the correlations between the coefficients derived from the first transformation, making the method fairly complex. In D2, the grouping and therefore the iteration of the transformation is done automatically: the method proposed by D2 (Shape Adapted DCT—SADCT) tends towards the combination of the advantages of speed of implementation. However, SADCT does not have flexibility and especially does not enable precise adaptation to the segment or properties of the signal on the segment.

SUMMARY OF THE INVENTION

An object of the invention is a method that combines the advantages of both classes of methods presented here above, hence a method with adaptativity to the segment, speed of computation and simplicity of implementation.

Thus, the implementation of the method proposed is of low complexity and its action is efficient. The method may be set up with the existing methods for it uses transformations that are known and already optimized.

The method can be adapted to the segment and makes it possible to take account of the 2D correlation of the signal on the segment. In terms of theoretical gain, the method proposed shows better results than all the other independent transformations of the signal, tested under certain usual hypotheses for the self-correlation function of the signal, which correspond to the intra mode. From the practical point of view, this method provides a gain as compared with the equally simple methods that have been tested. Its results are close to the results of far more complex methods.

The invention proposes a method for the linear transformation of the image signal on an arbitrarily-shaped segment by sub-division into regular sub-segments followed by the application of an orthogonal linear transformation to each segment and finally the iteration of the transformation in the transformed space.

It is assumed that the phase for the extraction of the objects has been completed, and the method is applied after this phase.

The invention therefore relates more specifically to a method for the linear transformation of the image signal on an arbitrarily-shaped segment, wherein chiefly said method comprises the following steps:
the sub-division of the segment into sub-segments of regular shapes (rectangular, square or linear shapes),
the application of an orthogonal linear transformation to each sub-segment,
the combining of the coefficients, coming from the first transformation, into classes of coefficients according to a predetermined criterion,
the iteration of the transformation on the classes of coefficients.

Indeed, should there remain a high correlation between the coefficients after the initial transformation step, the linear orthogonal transformation is iterated on sets of carefully chosen coefficients.

The use of a standard orthogonal linear transformation on each of the sub-segments (it is possible for example to use the DCT) is advantageous. This sub-division makes it possible to take advantage of the decorrelation and concentration capacity of the energy of a transformation such as the DCT in the context of the standard hypotheses of encoding on rectangles. In these hypotheses, the signal is modelled by a first-order separable Markov process highly correlated in the vertical and horizontal direction. This modelling is all the more valid when the zones to be encoded come from a segmentation on the criterion of homogeneity in terms of gray levels.

According to another characteristic, the combining step includes an intermediate step that consists in passing from a 2D space to vectors of coefficients with one dimension.

According to one mode of implementation, the intermediate step is performed by carrying out a zigzag reading of the coefficients.

According to another characteristic, the combining step consists in combining the coefficients representing the continuous components corresponding to each sub-segment in a vector having a size equal to the number of sub-segments.

According to another mode of implementation, the combining step consists in combining the same-ranking coefficients defined by the zigzag reading.

According to another mode of implementation, the combining step consists in combining the coefficients that are close in distance, a distance in the frequency space having been predefined.

According to another characteristic, the method furthermore consists in carrying out a final reorganization of coefficients according to a chosen order.

According to another characteristic, the chosen order is that of their rank after transformation, which is advantageous in the case of variable length encoding by analogy with the zigzag reading of the coefficients in the H261 recommendation of the CCITT.

According to another characteristic, the orthogonal linear transformation applied to the sub-segments is a discrete cosine transform.

Preferably, the same linear transformation is made during the iteration as during the processing of the sub-segments.

According to one mode of implementation, the iteration of the transformation is done with a standardized transformation matrix.

Thus, according to the invention, the problem of the transformation encoding of the arbitrarily-shaped segments is posed in a novel fashion. Although the formulation is based on known tools, it is distinguished from the other hitherto known methods, which have been presented in the present application, by a novel approach that is expressed by a sequencing of the different steps contributing to the resolving of the problem with the advantages indicated.

Furthermore, the combining step is original as compared with any method of block processing of the variables that has been proposed hitherto. This step enables the use of the correlation remaining on the segment and therefore makes it possible to achieve a more efficient decorrelation and a better concentration of energy for each segment. This type of combination of coefficients coming from a first 2D DCT step on rectangular segments has not been hitherto used. This operation indeed is not obvious inasmuch as the initial rectangles have variable sizes and is not a natural operation in principle. Besides, a standardization may prove to be necessary. Moreover, it is shown that the results are improved as compared with independent transformations on variable-sized blocks.

BRIEF DESCRIPTION OF THE DRAWINGS

Other features and advantages of the invention shall appear from the following description, given by way of a non-restricted example, with reference to the appended drawings of which:

FIGS. 6A, 6B, 6C are schematic illustrations of three algorithms for the combining of the coefficients with a view to the iteration of the transformation. The example is given on two sub-segments only but can easily be extended to any number of sub-segments, FIG. 7 shows the principle of the final reading of the coefficients in the transformation space, according to their rank after transformation, FIG. 8 shows a particular example where the iteration of the transformation is done only on the continuous components, FIGS. 9A, 9B show a concrete exemplary application of the method with a view to the encoding of the segments in the case of a depiction of a visiophonic image in terms of background and person.

MORE DETAILED DESCRIPTION

The sub-division, transformation, combining and iteration steps relate to the linear transformation proper while the step of final reorganization relates to the use of the concentration of the energy obtained by transformation.

This step is aimed at enabling efficient encoding based on the entropy of the information to be transmitted. The set of coefficients obtained after this transformation may be quantified by scalar quantification as in the case of the block processing of the signals. The quantification may be done uniformly on all the coefficients. It enables the modification of the result in terms of bit rate and distortion: the greater the quantification pitch, the greater the increase in distortion and the reduction in bit rate.

In practice, the quantification phase will be achieved in any encoding system.

The method proposed enables the taking into account of the 2D correlations of the signal to be encoded. In the case of regular shapes, the method can be reduced to simple DCT (if DCT is chosen as the initial transformation base), which is the method that has been chosen up till now in all recent image encoding standards.

The method enables the advantageous combining of computation speed and adaptability to the segment. Indeed, the DCT transform on regular segments is fast and efficient. The proposed method can easily be incorporated into existing encoding systems.

Figure 3:
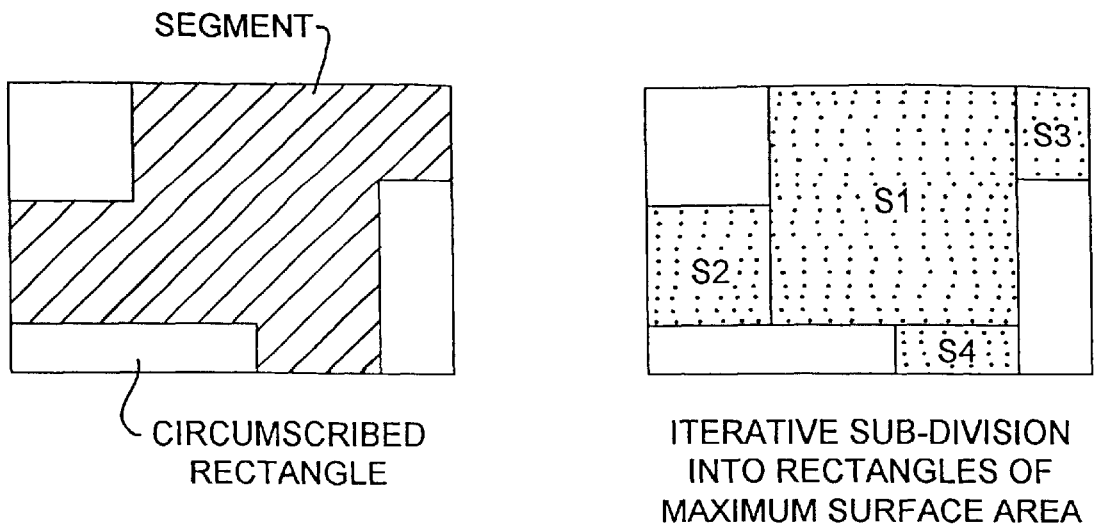
FIG. 3 shows an example of the paving of a segment given by the application of an algorithm for the search for rectangles of maximum surface area inscribed in the segment.

The sub-division into regular sub-segments makes it possible to take account of both the geometry of the segment and the properties of the signal to be encoded. A simple sub-division algorithm represents a small computation overload. An example of a possible sub-division is the recursive search for rectangular sub-segments having a maximum surface area inscribed within the segment as shown in FIG. 3. Another example of a possible sub-division is that of the sub-division into linear sub-segments (for example into columns).

According to another aspect of the invention, the iteration of the transformation is done on a set of coefficients chosen in order to concentrate the energy of the signal on the segment. This step is also flexible and can be modulated as a function of the geometry of the segment and the hypotheses on the signal. It is especially necessary to iterate the transformation on all the continuous components. Each continuous component represents the energy of the signal at zero frequency on each sub-segment. These continuous components are correlated and therefore the iteration of the transformation will enable a more efficient decorrelation and a more efficient concentration of energy.

Figure 4:
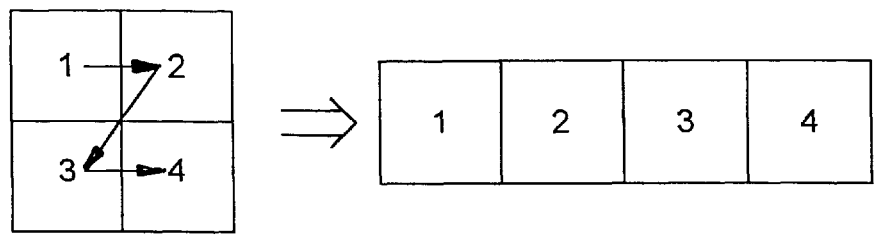
FIG. 4 shows an exemplary passage from a rectangular 2D segment to a 1D segment following the order of a zigzag reading, adapted to the reading of the coefficients in the transformed space.

The order of reading of the coefficients in the final transformed space is chosen for the (statistically) most efficient exploitation of the linear transformation step with a view to efficient encoding. The linear transformation is aimed at concentrating the energy and decorrelating the coefficients. The zigzag reading of the coefficients on regular blocks, as shown in FIG. 4, is justified by the fact that it is assumed that a signal has more energy in the low frequencies, in both the horizontal and the vertical directions. The zigzag reading therefore corresponds to a reading of the coefficients by order of importance.

In the event of the linear transformation proposed here above for arbitrary segments, the concentration of energy is also exploited.

The order of reading of the coefficients is therefore adapted to their importance according to the transformation performed, as shown in FIG. 7.

Figure 1:
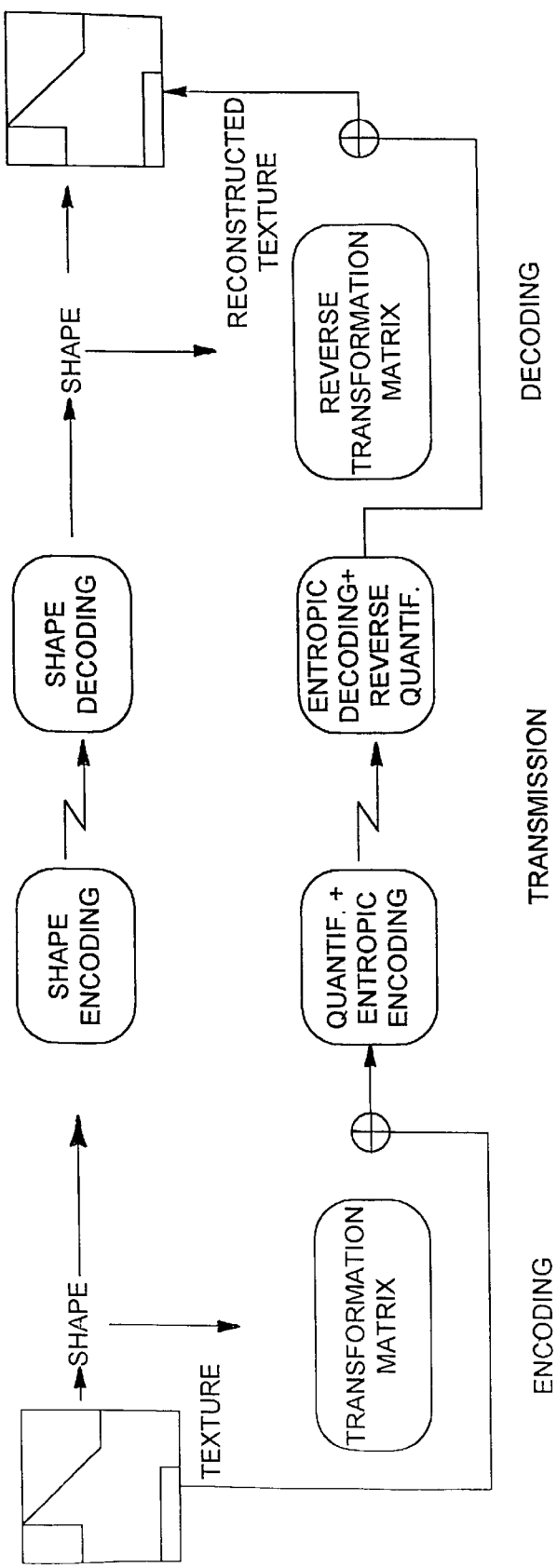
FIG. 1 is a drawing showing the general principle of the processing of an arbitrarily-shaped object [where the detection of the object is not included]
Figure 2:
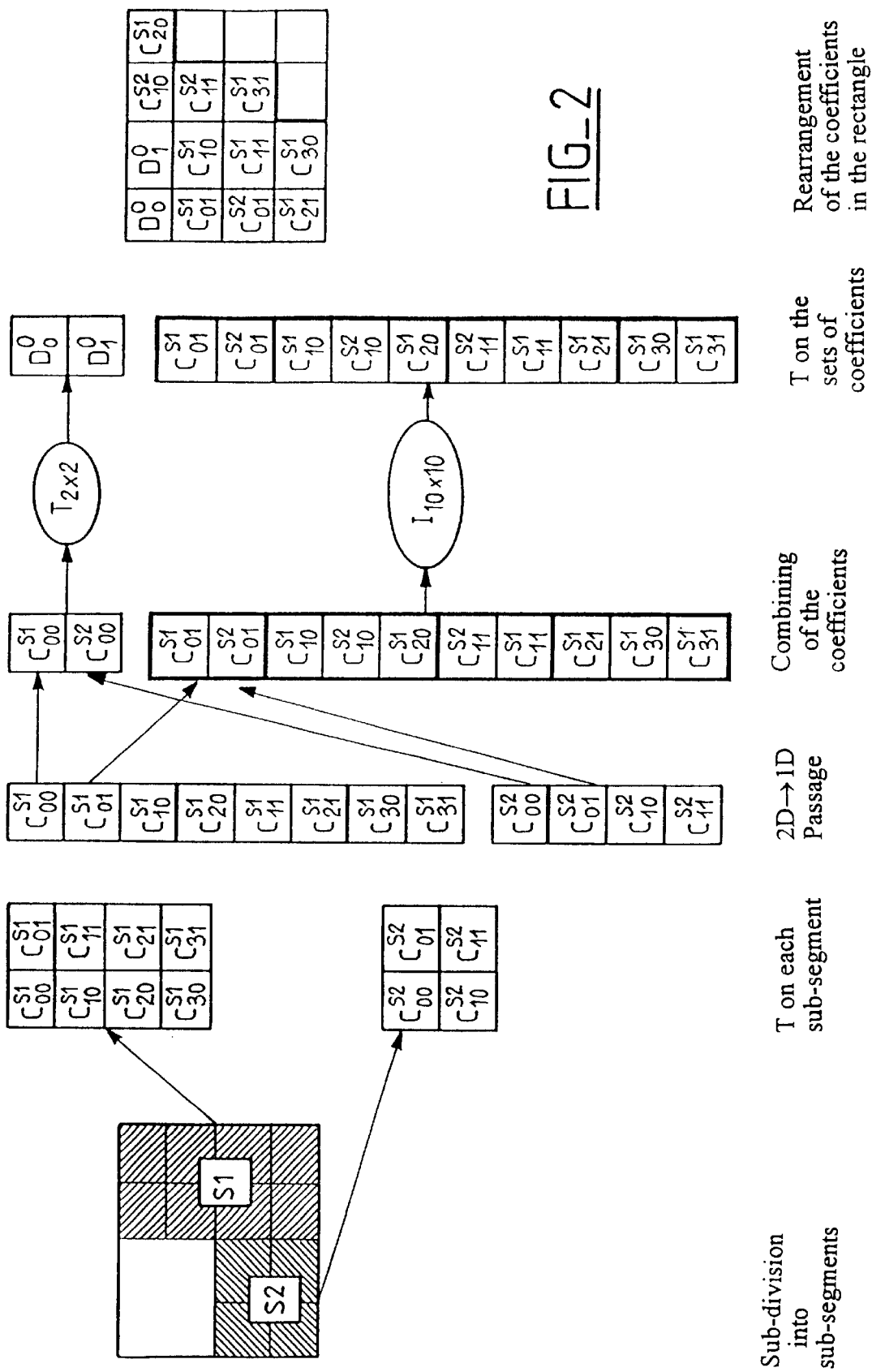
FIG. 2 is a complete drawing of the proposed encoding method, including a possible example of implementation.

In the example given, the method presented pertains solely to the encoding of the interior of the object, it being assumed that the contours are known to the decoder and therefore encoded and transmitted beforehand by any appropriate and known method. At least all the quantified coefficients are transmitted, regardless of the implementation chosen, as shown in FIG. 1. For greater flexibility, the method of sub-division, the basic transformation applied or the order of reading of the coefficients may also be transmitted if necessary.

An exemplary application of the method is in the encoding of the visiophonic sequence in terms of background/ person as shown in FIG. 9. The contours of the person are detected by any known appropriate means and it is assumed that the background is fixed.

Therefore, only the person will be encoded. A rectangular grid, formed for example by 8×8 blocks, is superimposed on the image to be encoded so as to restrict the size of the segments possible.

Only the blocks containing both a part of the background and a part of the person then have to be encoded by an appropriate method. The advantage of such a scheme is that it is enough then to have computed, at both the encoder and the decoder, the P-sized 1D transformation matrices, for P varying from 2 to 8. The surplus memory needed for the encoder as well as the decoder is then very small.

The method for carrying out the transformation of the image signal on arbitrarily-shaped segments for the encoding of texture pertaining to the invention may be described theoretically as a linear transformation. This linear transformation may or may not be orthogonal. Its transformation matrix is the composition (multiplication) of several transformation matrices, each corresponding to one step of the encoding method.

The first step of the method is that of the sub-division of the given segment into a set of regular sub-segments. This is a 2D paving operation.

According to the example, the paving is done by the recursive search for rectangles of maximum surface area inscribed in the segment as shown in FIG. 3.

According to another example, the passage is obtained by sub-dividing the segment into a set of columns/linear sub-segments.

If X is the reference given to the 1D vector obtained by the reading of the points of the segment in the order of the video scanning, this step amounts to permutating the components of the vector X, hence multiplying this vector by a permutation matrix $P_1$. We therefore obtain:

$$x_1 = P_1 X$$

The matrix $P_1$ depends on the segment and the sub-division method applied.

The vector $X_1$ then contains Y-axis points along the regular sub-segments.

If $D_{MN}$ refers to the orthonormal transformation matrix (for example the DCT) on a rectangle with M rows and N columns, the step 2 of the method arrives at a new vector $X_2$:

$$X_2 = \begin{pmatrix} a_1 D_{M_1 N_1} & & 0 \\ & a_i D_{M_i N_i} & \\ 0 & & a_P D_{M_P N_P} \end{pmatrix} X_1 = A X_1$$

where $M_i$ and $N_i$ are respectively the number of rows and columns of the $i^{th}$ sub-segment and the $a_i$ values are predetermined constants of standardization. [A] is a blockwise orthogonal matrix.

The step 3 for the rearrangement of the coefficients after this first transformation 3 also amounts to a permutation of the components $X_2$, hence to multiplication by a permutation matrix P2 which depends on the geometry of the segment and $$X_3 = P_1 X_2$$

This step is important. It includes an intermediate phase which is the passage from a 2D space to one dimension represented by the vectors of coefficients (1D) on which the transformation will be reiterated as shown in FIG. 4.

Figure 5:
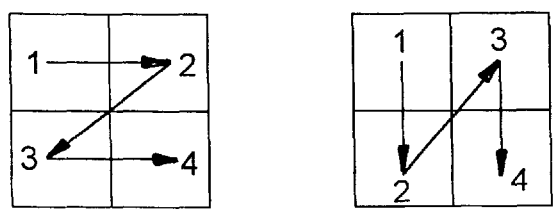
FIG. 5 shows the two types of standard paths for the zigzag reading.

The simplest and most direct way of passing from the coefficients on a given sub-segment (hence passing from 2D to 1D) is to take the zigzag reading of the coefficients as can be seen in FIG. 4. The choice of the direction of the zigzag (FIG. 5) is unimportant.

According to another characteristic of the invention, several methods are proposed to combine the coefficients into 1D vectors with a view to iterating the transformation as can be seen in FIG. 6.

Three different types of combinations are proposed:

the first combination is the combination of the continuous components corresponding to each sub-segment into a vector with a size equal to the number of sub-segments as shown in FIG. 6, another possibility is to combine the same-ranking coefficients in the preliminary zigzag, as can be seen in FIG. 6B. Then, the transformation is iterated on the vectors containing all the coefficients of a given rank coming from each sub-segment, finally, a third possible mode of implementation consists in combining the sets of coefficients and defining a distance in the frequency space and in combining the coefficients that are close in terms of this distance.

Finally, the next step is a step of carrying out a transformation on the subsets of combined coefficients, which is written by analogy with the step 2 as:

$$Y = \begin{pmatrix} b_1 T_{M_1} & & 0 \\ & b_i T_{M_i} & \\ 0 & & b_P T_{M_P} \end{pmatrix} X_3 = B X_3$$

where $T_M$ represents either the matrix of a linear transformation (M×M) corresponding to the same phase as in the step 2 (the DCT for example) for an M-sized 1D vector or the identity transformation.

The step of zigzag-type reading of the coefficients is not included in the transformation.

The transformation proposed is written therefore as a linear transformation for which it is possible to compute the matrix explicitly for each segment:

$$Y = TX$$

$$T = B P_2 A P_1$$

the matrices A and B are orthogonal by blocks and the matrices $P_i$ are permutation matrices. This makes the final matrix T reversible without any algebraic computation.

It is important to note that this theoretical formulation is useful only for the study and theoretical validation of the method proposed. The matrix of the transformation can be computed dynamically at both the encoder and the decoder solely from the knowledge of the shape of the object. The matrix of the transformation does not have to be stored or transmitted. For this, reference may be made to FIG. 1.

The matrix T is orthonormal in the particular case where all the standardization coefficients $a_i$ and $b_i$ are equal to 1.

In order to improve the performance characteristics of the iteration of the transformation, it is possible, in the first step, to apply not standard DCT matrices (i.e. orthonormal matrices) but standardized transformation matrices. This makes it possible to increase the correlation of certain coefficients after this first step and especially the correlation between the continuous components of each sub-segment.

An exemplary correlation coefficient for the first step is:

$$a_i = \frac{1}{\sqrt{M_i N_i}}$$

$$b_i = \sqrt{K}$$

K=number of points of the segment.

It is then possible to define the order of reading of the coefficients with a view to quantification and encoding. The coefficients are combined according to their rank after the last transformation. All the first-rank coefficients and then all the second-rank coefficients are read according to the drawing of FIG. 7.

The method has been tested with the following variant which has been shown schematically in FIG. 8:

recursive sub-division into rectangular sub-segments of maximum size, the iteration of the transformation on continuous components with the coefficients of standardization given here above.

This test has shown that the method proved to be superior, in terms of gain in theoretical encoding, to similar fast transformations.

The proposed method may be used to encode any type of region.

In intra mode, the segmented regions may come from an automated segmentation for a given criterion of homogeneity as for example low variation in terms of gray levels.

In inter mode, the zones to be encoded may be zones where the compensation of motion has not proved to be sufficient. In an object-based encoder, the motion compensation is done by region and therefore the zones where the predicted signal is not close enough to the initial signal will be all the more arbitrarily-shaped.

What is claimed is:

1. A method for the linear transformation of an image signal on an arbitrarily-shaped segment, comprising:
   (A) subdividing the arbitrarily-shaped segment into a plurality of sub-segments of regular shapes of varying proportions;
   (B) applying a first forward orthogonal linear transformation to each sub-segment;
   (C) combining the coefficients of different sub-segments, and coming from the first transformation, into classes of coefficients according to a predetermined criterion;
   (D) iterating a second forward transformation on the classes of coefficients, wherein the second transformation is applied to a one-dimensional space; and
      wherein the combining step includes an intermediate step of passing from a two-dimensional space to a plurality of vectors having coefficients with one dimension.

2. A method of transformation according to claim 1, wherein the intermediate step is performed by carrying out a zigzag reading of the coefficients.

3. A method of transformation according to claim 1, wherein the combining step comprises combining the coefficients representing the continuous components corresponding to each sub-segment in a vector having a size equal to the number of sub-segments.

4. A method of transformation according to claim 4, wherein the combining step comprises combining the same-ranking coefficients defined by the zigzag reading.

5. A method of transformation according to claim 1, wherein the combining step comprises combining the coefficients that are close in distance, a distance in the frequency space having been predefined.

6. A method of transformation according to claim 5 wherein, furthermore, a final reorganization of the coefficients is done according to a chosen order.

7. A method of transformation according to claim 6, wherein the chosen order is that of their rank after transformation.

8. A method of transformation according to claim 1, wherein the orthogonal linear transformation applied to the sub-segments is a discrete cosine transform.

9. A method of transformation according to claim 1, wherein the first and second transformations are the same.

10. A method of transformation according to claim 9, wherein the iteration of the transformation is done with a standardized transformation matrix.

11. A method of transformation according to claim 1 wherein, during the subdividing step, the segment is subdivided into sub-segments of regular shapes selected from the group consisting of rectangular shapes, squares shapes and linear shapes.

12. A method for the linear transformation of an image signal on an arbitrarily-shaped segment, comprising:
   (A) subdividing the arbitrarily-shaped segment into a plurality of sub-segments of regular shapes of varying proportions, the regular shapes being a member of the group consisting of rectangular shapes, squares shapes and linear shapes, wherein the size and shape of the sub-segments are arbitrary and not known prior to subdividing the arbitrary-shaped segment;
   (B) applying a first forward discrete cosine transformation to each sub-segment;
   (C) combining the coefficients of different sub-segments, and coming from the first transformation, into classes of coefficients according to a predetermined criterion; including passing from a two-dimensional space to vectors of coefficients with one dimension; and
   (D) iterating a second forward discrete cosine transformation on the classes of coefficients, wherein the second transformation is applied to a one-dimensional space.

13. A method of transformation according to claim 12, wherein the intermediate step is performed by carrying out a zigzag reading of the coefficients.

14. A method of transformation according to claim 12, wherein the combining step comprises combining the coefficients representing the continuous components corresponding to each sub-segment in a vector having a size equal to the number of sub-segments.

15. A method of transformation according to claim 12, wherein the combining step comprises combining the same-ranking coefficients defined by the zigzag reading.

16. A method of transformation according to claim 12, wherein the combining step comprises combining the coefficients that are close in distance, a distance in the frequency space having been predefined.

17. A method of transformation according to claim 12 wherein, furthermore, a final reorganization of the coefficients is done according to a chosen order.

18. A method of transformation according to claim 17, wherein the chosen order is that of their rank after transformation.

19. A method of transformation according to claim 12, wherein the first and second transformations are the same.

20. A method of transformation according to claim 19, wherein the iteration of the transformation is done with a standardized transformation matrix.

* * * * *

UNITED STATES PATENT AND TRADEMARK OFFICE
CERTIFICATE OF CORRECTION

PATENT NO. : 6,427,028 B1 Page 1 of 1
DATED : July 30, 2002
INVENTOR(S) : Ioana Donescu et al.

It is certified that error appears in the above-identified patent and that said Letters Patent is hereby corrected as shown below:

<u>Title page,</u>
Item [73], "Assignee: France Telecome, Paris (FR)" should read -- Assignee: France Telecom, Paris (FR) --.

Signed and Sealed this

First Day of October, 2002

*Attest:*

*Attesting Officer*

JAMES E. ROGAN
*Director of the United States Patent and Trademark Office*